United States Patent [19]

Serkez

[11] 4,210,302
[45] Jul. 1, 1980

[54] HANDBAG HOLDER

[76] Inventor: Alvin A. Serkez, Tappan, N.Y.

[21] Appl. No.: 27,888

[22] Filed: Apr. 6, 1979

[51] Int. Cl.² .................................................. A47F 5/00
[52] U.S. Cl. .................................. 248/308; 248/205 R
[58] Field of Search ................... 248/205 R, 215, 300, 248/308, 307, 301, 304, 188.8, 188.9; 24/230.5 AD, 230.5 R

[56] References Cited

U.S. PATENT DOCUMENTS

| | | | |
|---|---|---|---|
| 1,751,198 | 3/1930 | Franck | 248/308 |
| 2,473,086 | 6/1949 | Montero | 248/308 |
| 2,500,471 | 3/1950 | Schmiedt | 248/308 |
| 2,842,822 | 7/1958 | Bennett | 248/308 X |
| 3,432,131 | 3/1969 | Martin | 248/188.8 |
| 3,860,210 | 1/1975 | Berardinelli | 248/308 |
| 4,073,454 | 2/1978 | Sauber | 248/188.8 X |
| 4,118,001 | 10/1978 | Serkez | 248/308 |

FOREIGN PATENT DOCUMENTS

| | | | |
|---|---|---|---|
| 367558 | 1/1923 | Fed. Rep. of Germany | 248/308 |
| 665285 | 9/1929 | France | 248/205 R |
| 1290629 | 9/1972 | United Kingdom | 248/308 |

Primary Examiner—J. Franklin Foss
Attorney, Agent, or Firm—Hubbell, Cohen, Stiefel & Gross

[57] ABSTRACT

A handbag holder folds into a compact form smooth and free of surface projections. A flat region is provided for messages. Folding support and hook arms are fitted snugly with light friction so as not to come open unless intended. Ears on the arms are flush with the body when closed, and may be grasped for opening. The support arm is fixed with a swivel top having a rubber friction foot for resting on a table, and the hook arm is grooved to receive the strap of the handbag. The support arm is movable relative to the swivel top so as to permit the handbag holder to be used on tables with a thick ledge or top.

4 Claims, 9 Drawing Figures

HANDBAG HOLDER

CROSS REFERENCE TO RELATED APPLICATIONS

This application is related to and incorporates by reference the entire contents of my issued U.S. Pat. No. 4,118,001, issued on Oct. 3, 1978 on an application (Ser. No. 895,263, filed on Apr. 10, 1978.

BACKGROUND OF THE INVENTION

1. Field of the Invention

This invention relates to devices that may be placed at an edge of a table or other support surface to provide a hook for holding the strap of small articles such as purses, camera cases, shopping bags, unbrellas, and the like, and more particularly, to an improvement upon the device disclosed and claimed in my U.S. Pat. No. 4,118,001.

2. The Prior Art

Prior art handbag holders are not very compact, even when folded, and are irregular in shape, tending to catch on other things when carried about in coat pockets or ladies' handbags. An example of such prior art product is a handbag holder commercially distributed under the name "hang on" by Efson, Inc. of Hauppauge, New York. This holder has a built-in swivel support disc and a fixed U-shaped hook to which the swivel support disc is attached at one end. The U-shaped hook causes the holder to snag on loose items when carried in a handbag prior to use, and therefore requires the use of a separate case. Moreover, the fixed U-shape requires a case which occupies wasted volume in a handbag while being carried prior to use. In addition, such devices can be used as business promotional gifts. In such instance, it is desirable to have a convenient place on the device for a message. Thus, although some of these problems may be solved by supplying a plastic envelope or case for storing the holder, such envelopes add to bulk, waste additional space, make one more item to carry, and tend to be left behind or lost. These disadvantages of the prior art are overcome by the present invention.

SUMMARY OF THE INVENTION

My prior U.S. Pat. No 4,118,001, (which is not prior art) discloses and claims a handbag holder which is in the form of a compact, elongated box open on the front, into which are snugly fitted a longer support arm and a shorter hook arm, pivoted, respectively, just within the ends of the box. When the holder is closed, the front surface is flush. Ears near the outer ends of the arms rest in slots formed in the box. Shoulders on the arms contact the ends of the box when they are opened to the desired angle, preventing their opening further. There is a rubber contact pad on the support arm, and a groove is formed across the hook arm to receive the strap of the bag.

According to the improvement of the present invention, the free end of the support arm has first and second surfaces which are in non-coplanar relationship with each other and a base member having upper and lower surfaces. Means are provided for securing the free end of the support arm to the base member for movement between a first position wherein the first surface is seated on the upper surface of the base member and a second position wherein the second surface is seated on the upper surface of the base member.

DETAILED DESCRIPTION OF THE INVENTION

Figure 1:
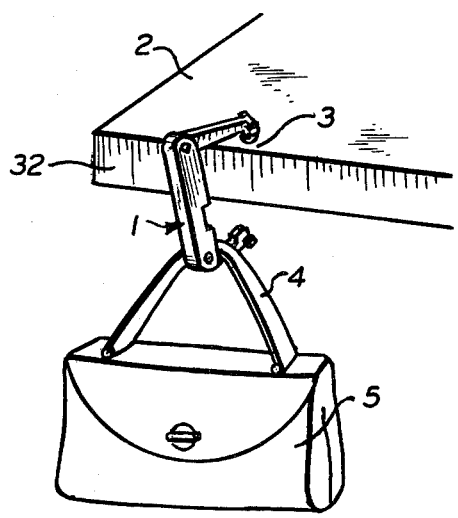
FIGS. 1-7 are identical to FIGS. 1-7 of my issued U.S. Pat. No. 4,118,001.
Figure 2:
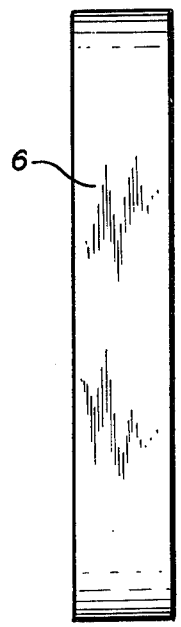
Figure 3:
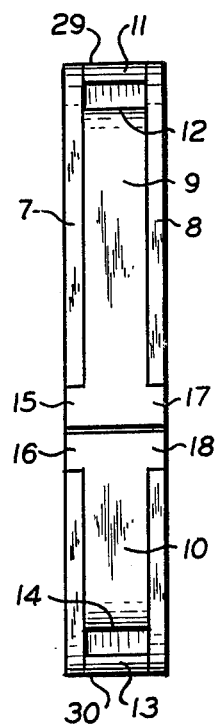
Figure 4:
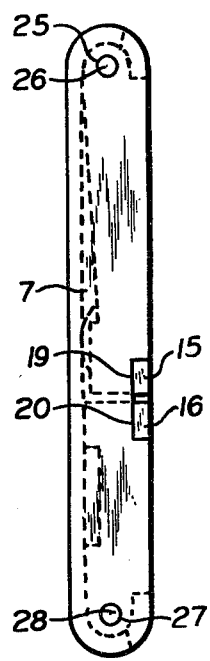
Figure 5:
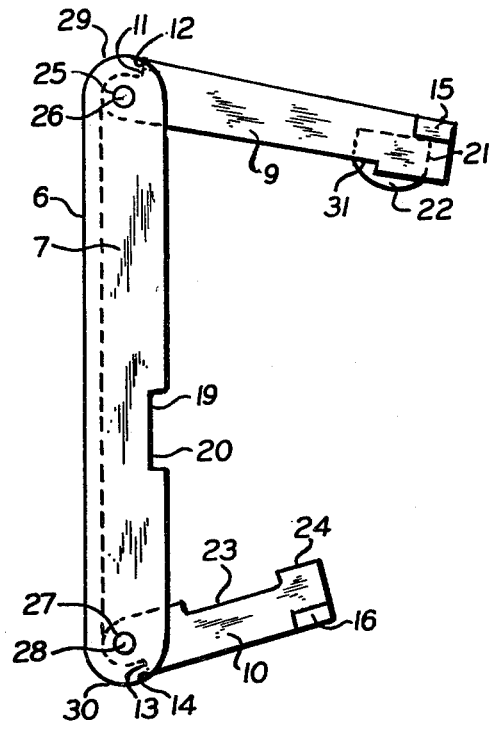
Figure 6:
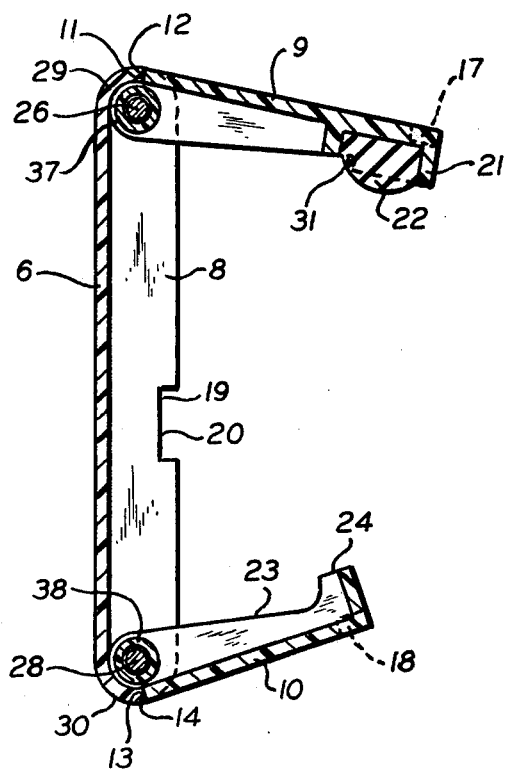
Figure 7:
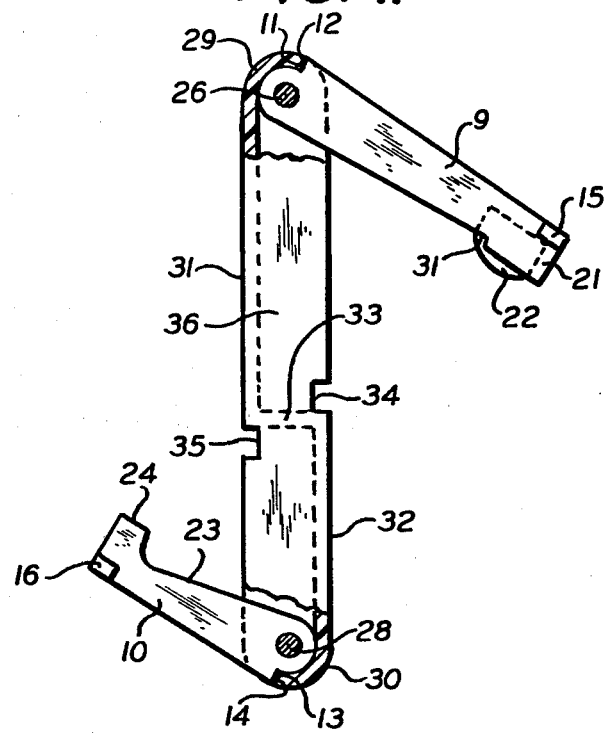
Figure 8:
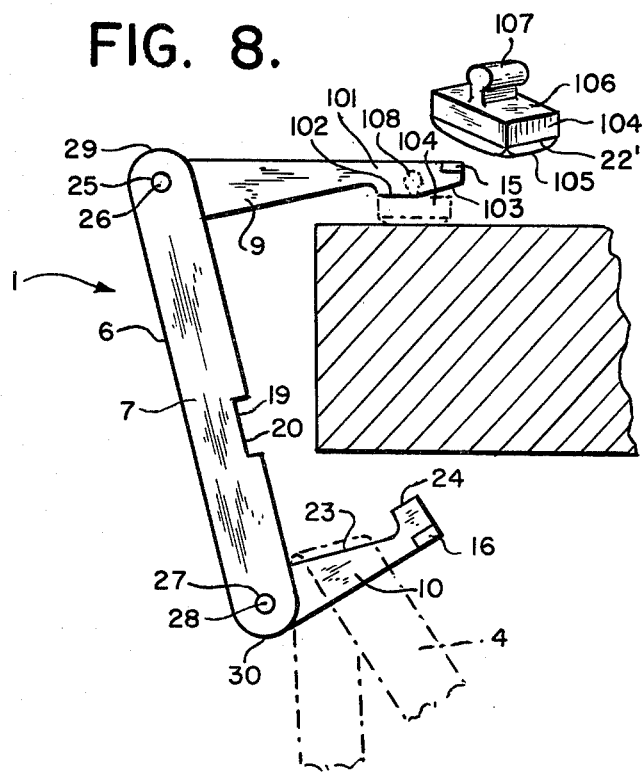
FIG. 8 is a side elevation view of the open handbag holder of the present invention.
Figure 9:
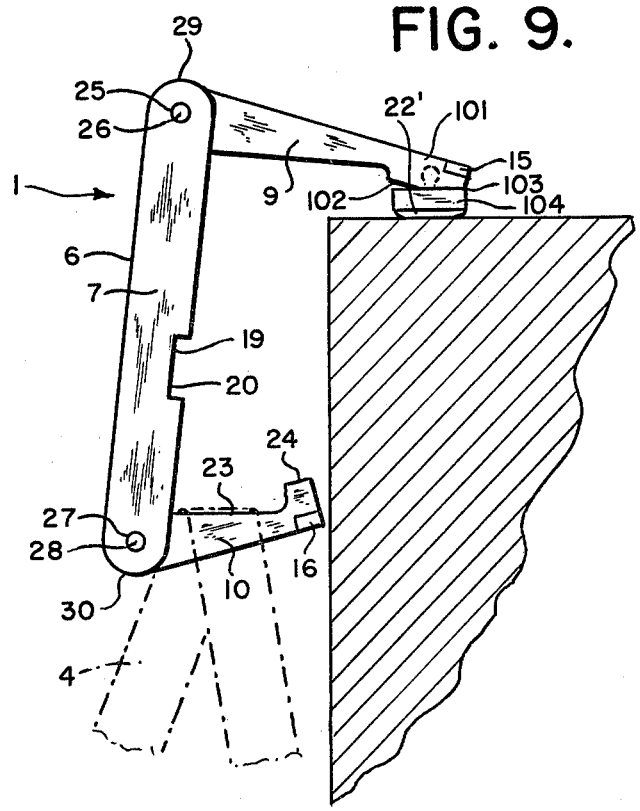
FIG. 9 is a side elevation view of the same handbag holder in use on a wide shelf or ledge.

The preferred embodiment of the improved handbag holder of the present invention is shown open and in use in FIGS. 8 and 9, wherein the handbag holder 1 rests near an edge of a table or a cabinet holding strap 4 of a purse.

Details of the construction and operation of the handbag holder of my already issued U.S. Pat. No. 4,118,001, including a detailed description of FIGS. 1-7 thereof, are set forth in that patent and the entire contents thereof are expressly incorporated herein by reference.

As is readily apparent from a comparison of FIGS. 1-7 on the one hand, and FIGS. 8-9 on the other, the improvement of the present invention relates to the structure of the support arm 9. Specifically, the free end 101 of support arm 9 is tapered so as to provide first and second surfaces 102 and 103 which are in non-coplanar relation with each other. A base member 104 having upper and lower surfaces 106 and 105 is provided. Said base member includes means 107 for securing the free end 101 of the support arm 9 to the base member 104 through recess 108 for movement between a first position wherein the first surface 102 is seated on the upper surface 106 (shown in FIG. 8) and a second position wherein the second surface 103 is seated on the upper surface 106 (shown in FIG. 9). In more detail, securing means 107, 108 preferably comprises a mushroom-shaped projection 107 on the upper surface 106 of base member 104 which extends upwardly therefrom and a complementary recess 108 provided on the free end 101 of support arm 9. The dimensions and configuration of recess 108 are complementary to those of projection 107.

As in my issued patent, an elastomeric foot 22' is secured to the lower surface 105 of base 104 to provide traction and minimize slippage of the handbag holder when it is in use.

The improved handbag holder of the invention serves its full function when open and in use, securely supporting small objects off a table edge, yet posing no danger to fine furniture finishes. It closes to a small box of simple neatness, free of any protrusions to snag or catch other items, and comfortable to hold in the hand. It may be opened by the pads of the finger tips, not needing to be pried with fingernails or hairpins, yet will not fall open unintended.

While the invention has been described in its preferred form, various modifications may be made without departing from the scope and spirit thereof, and it is to be understood that the invention is not limited to the specific embodiments shown and described except as defined in the appended claims.

What is claimed is:

1. In a holder for a bag having a strap, said holder being of the type including an elongate body; a support arm having one end pivotally secured to one end of said body for movement between a retracted position wherein said support arm is substantially aligned with said body and an extended position wherein said support arm extends away from said body and on one side thereof; and a hook arm pivotally secured to the other end of said body for movement between a retracted position wherein said hook arm is substantially aligned with said body and an extended position wherein said hook arm extends away from said body on said one side thereof, the improvement comprising:

the free end of said support arm having first and second surfaces in non-coplanar relation;

a base member having upper and lower surfaces; and means for securing the free end of said support arm to said base member for movement between a first position wherein said first surface is seated on said upper surface and a second position wherein said second surface is seated on said upper surface.

2. The bag holder according to claim 1, wherein said securing means comprises:
   a projection secured to said upper surface and extending upwardly therefrom; and
   said free end of said support arm having a recess dimensioned to receive said projection.

3. The bag holder according to claim 2, wherein:
   said upper and lower surfaces of said base member are substantially planar, parallel surfaces,
   wherein said first and second surfaces are substantially planar surfaces joined along a common edge;
   said recess extends substantially along said common edge; and
   said projection has a generally mushroom-shaped cross section.

4. The bag holder according to claim 3, wherein said lower surfaces is comprised of an elastomeric material.

* * * * *